June 25, 1968 — E. C. WAHL — 3,389,916
FLOATING RING SHAFT SEAL
Filed July 8, 1965
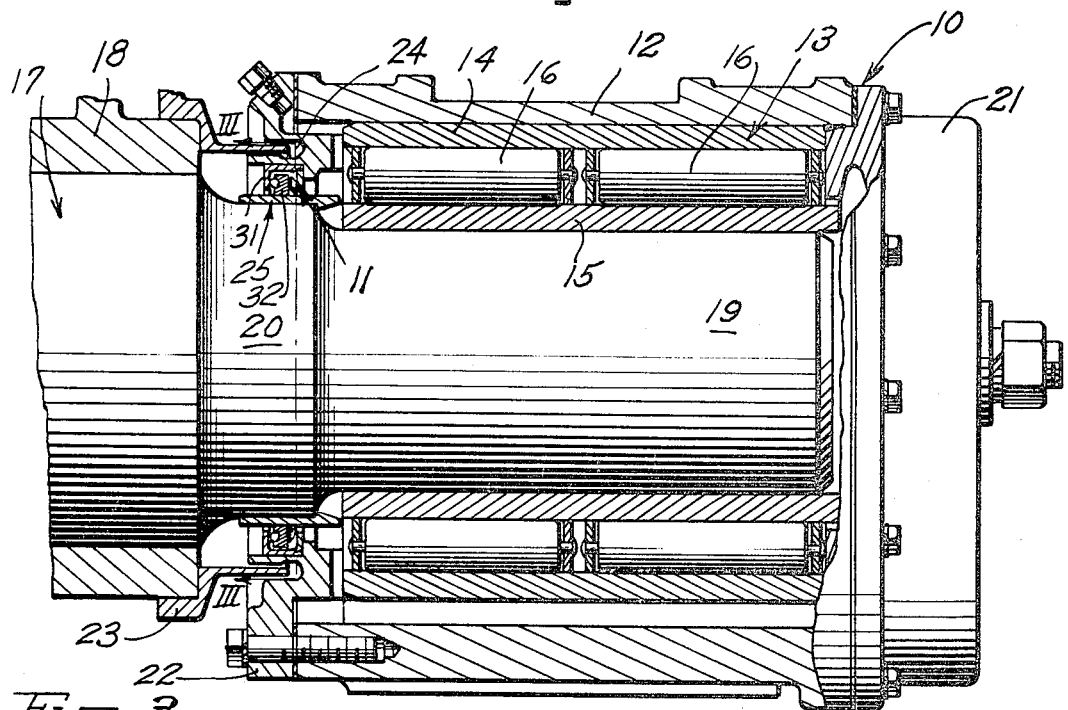
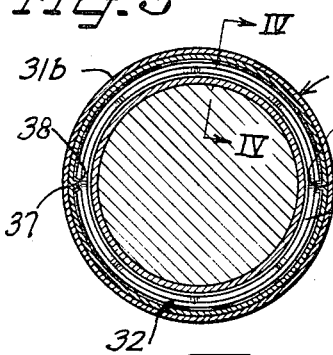
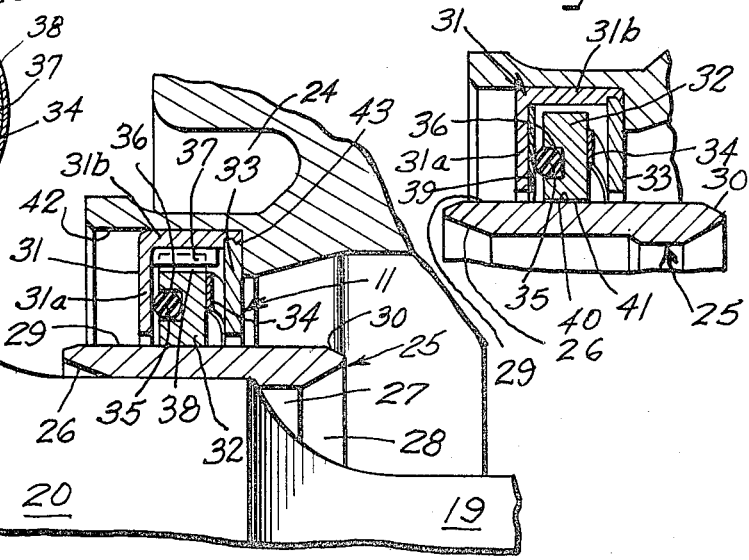
INVENTOR.
Edward C. Wahl

United States Patent Office 3,389,916
Patented June 25, 1968

3,389,916
FLOATING RING SHAFT SEAL
Edward C. Wahl, Arlington Heights, Ill., assignor to Gits Bros. Mfg. Co., Chicago, Ill., a corporation of Delaware
Filed July 8, 1965, Ser. No. 470,461
4 Claims. (Cl. 277—41)

ABSTRACT OF THE DISCLOSURE

A mechanical seal having particular adaptability to railroad journal boxes which consists of a casing press fitted into the inboard end of the journal box, a sleeve press fitted around an axle received in the journal box and through the casing, a rigid seal ring in the casing and around the sleeve, an O-ring seal between the casing and the seal ring, a spring loading the seal ring into sealing engagement with the O-ring and the O-ring with the casing, key and key slots to prevent rotation of the seal relative to the casing, and the dimensions of the seal ring and casing such as to allow the seal ring to move radially and axially within the casing and the dimensions of the seal ring and sleeve such as to provide close running clearance relationship therebetween having a minimal gap between the sleeve and the ring to prevent friction therebetween.

---

This invention relates to a unitary seal assembly for shafts and the like wherein a seal ring is floatably carried in sealing engagement in a casing to accommodate shaft irregularities and run-outs. Specifically, this invention deals with a railway journal box seal including a sleeve pressed on the axle, a bronze ring riding on a film of lubricant or gas on this sleeve and providing a uniform orifice between the interfaces thereof, a casing press fitted in the inner cover for the journal box carrying the bronze ring therein while holding the ring against rotation but allowing it to float radially, an elastomeric seal between the bronze ring and casing, and a spring holding the seal in sealed engagement with the bronze ring and casing.

The invention provides a simple self-contained floating ring seal that is easily installed and maintains its own optimum operating clearances and relationship of parts regardless of variations in installations. Thus, the sleeve provided with the seals of this invention can be press fitted on wheel axles or the like to present to the seal ring a uniform constant diameter surface on which the seal ring is to ride. The casing in which the seal ring is mounted, can be press fitted or otherwise secured to a receiving recess of the journal box and the seal ring, which is floatably carried in the casing, can accommodate irregularities due to shaft run-outs and the like since it is free to float in the casing. The elastomeric seal between the floating seal ring and the casing rides on a smooth casing wall, preferably Teflon coated, which will not impede free floating of the seal ring in the casing. The elastomeric seal preferably takes the form of a rubber O-ring. A wave spring urges the seal ring against the O-ring which in turn is urged against the casing wall to maintain the sealed relationship between the seal ring and casing wall.

It is then an object of this invention to provide a floating shaft seal having a casing floatably carrying a rigid seal ring while holding the ring against rotation and an elastomeric seal between the casing and seal ring which does not interfere with the floating support of the seal ring in the casing.

A still further object of the invention is to provide a floating ring seal for shafts which rides on a film of lubricant or other fluid and provides a uniform orifice or gap and which can float in a radial direction to accommodate shaft run-outs or other irregularities.

A still further object of this invention is to provide a railway journal box seal having a sleeve pressed on the wheel axle, a bronze seal ring riding on this sleeve with a constant clearance relationship, a casing floatingly carrying the bronze seal ring and an O-ring seal between the casing and bronze sealing ring which will not interfere with free floating movement of the seal ring in the casing.

A specific object of this invention is to provide a railway journal box seal having a casing adapted to be press fit in the inboard end of the journal box, a bronze ring floatingly carried in the casing, a sleeve adapted to be press fit on the wheel axle projecting into the journal box and receiving the floating seal ring thereon, an O-ring seal between the casing and floating seal ring, and a spring loading the O-ring between the casing and sealing ring.

A still further specific object of this invention is to provide a floating type seal ring for shafts and the like wherein a rigid seal ring is carried in a cup-shaped casing equipped with keys for holding the ring against rotation but allowing the ring to shift axially and radially in the casing, and to provide an O-ring seal between the casing and seal ring with the O-ring riding on a smooth casing wall and contained in a groove of the seal ring.

Other and further objects of this invention will be apparent to those skilled in this art from the following detailed description of the annexed sheet of drawings which, by way of a preferred example only, illustrates one embodiment of the invention.

On the drawings:

FIGURE 1 is a longitudinal cross sectional view, with parts in elevation, of a railway journal box and axle assembly equipped with a seal of this invention;

FIGURE 2 is a enlarged fragmentary view of a portion of the assembly of FIGURE 1 and better illustrating the seal construction;

FIGURE 3 is a cross sectional view generally along the line III—III of FIGURE 1 illustrating the clearance relationship between the seal ring and the casing; and FIGURE 4 is an enlarged detail view taken generally along the line IV—IV of FIGURE 3.

As shown on the drawings:

The reference numeral 10 of FIGURE 1 illustrates generally a railway journal box and axle assembly while the reference numeral 11 designates generally the seal of this invention for the assembly 10. The assembly 10 includes a journal box casing 12 with a roller bearing unit 13 carried therein and composed of an outer race 14, an inner race 15 and roller bearings 16 between the races. An axle 17 has the hub of the railroad wheel 18 mounted thereon at the inboard end of the journal box housing 12 and the axle has a reduced diameter end portion 19 mounted in the inner race 15 of the bearing assembly 13. The axle has a portion 20 of larger diameter than the end portion 19 which extends from the wheel hub 18 into the journal box. The outboard end of the journal box is closed by a bolted-on cover 21. The inboard end of the journal box is closed by a ring 22 in which the seal 11 of this invention is mounted and a flinger or dirt guard sleeve 23 extends from the wheel hub 18 into a groove 24 of this cover ring 22.

The seal assembly 11 includes a metal sleeve 25 press fitted onto the axle portion 20. This sleeve has a tapered mouth 26 leading to a cylindrical bore 27 and terminating in a tapered or beveled outboard end 28. The outer periphery of the sleeve 25 is a true flat cylindrical surface 29 with a blended radius 30 at the outboard end of the sleeve.

The seal assembly 11 also includes an annular cup-shaped metal casing 31 housing the bronze seal ring 32 and closed by a radial ring or washer 33 spun into the mouth of the cup. A wave spring 34 is provided between the seal ring 32 in the washer 33 and a rubber O-ring 35 is positioned between the bottom of the cup and the seal ring. For this purpose, the seal ring 32 has an annular groove 36 in the face thereof adjacent the bottom wall 31a of the cup and the O-ring rides on this bottom wall. The cup also has a skirt or side wall 31b in right angle relation to the wall 31a. A pair of metal lugs 37 are secured to this wall 31b on the inner surface thereof in diametrically opposed relation and these lugs extend from the bottom wall 31a almost to the closure plate 33. The bronze ring has key slots 38 receiving the lugs 37.

As shown in FIGURE 2, the bottom wall 31a of the casing 31 and the closure washer 33 have apertures therethrough substantially larger than the outer diameter 29 of the sleeve 25 so as to provide ample clearance therebetween.

As shown in FIGURE 3, the bronze seal ring 32 has an outer diameter substantially less than the inner diameter of the casing so that its outer periphery is spaced from the casing wall 31b. As also shown in FIGURE 3, the key slots 38 of the ring 32 are substantially wider and deeper than the keys or lugs 37 so that the ring 32 can float radially in the casing.

As shown in FIGURE 4, the bottom wall 31a of the casing 31 preferably has a "Teflon" coating 39 thereon to present a very smooth low-friction surface to the O-ring 35 so that free radial shifting of the bronze seal ring 32 will not be impeded.

As also shown in FIGURE 4, the flat cylindrical outer peripheral surface 29 of the sleeve 25 confronts the flat cylindrical inner wall 40 of the bronze seal ring 32 in close running clearance relationship. It is desired that a narrow fixed orifice gap 41 be maintained between the interfaces 29 and 30 of the sleeve and seal ring with the seal ring riding on a film of lubricant or gas thereby providing a very effective seal between the seal ring and sleeve without imparting a friction load. In journal box installations, including seals of this invention, the rotating sleeve 25 has its outer cylindrical surface 29 sized to 8.375 inches in diameter while the confronting surface 40 of the ring 32 is sized to 8.380 inches in diameter. This leaves an operating clearance of .005 inch for the gap or orifice 41. Such a gap, filled with lubricant or trapped gas, will not pass material therebetween.

The mouth 26 of the sleeve 25 facilitates the mounting of the sleeve on the axle portion 20 while the radius blend 30 on the O.D. of the sleeve facilitates the mounting of the seal ring 32 thereon.

The seal ring 32 is narrower than the space between the bottom wall 31a of the casing 31 and the washer 33 so as to be axially shiftable in the casing. The wave spring 34 bottomed on the washer urges the seal ring 32 toward the bottom wall 31a of the casing and the O-ring 35 is thus sealingly compressed between this wall and the seal ring. Leakage between the seal ring and casing is thereby prevented by the O-ring while at the same time the seal ring 32 floats both axially and radially in the casing.

In the installation of FIGURES 1 and 2, the casing 31 is press fitted into a cylindrical recess 42 in the cover 22 of the journal box with the washer 33 bottomed against a radial shoulder 43 at the bottom of this recess. The cylindrical wall 31b of the casing has a tight sealed engagement with the cylindrical wall of the recess 42 so that leakage cannot occur around the casing.

From the above description, it will, therefore, be understood that this invention provides a floating ring seal, especially useful for journal boxes wherein a rigid seal ring has a close running clearance relationship with a sleeve and is floatingly carried in a housing in sealed relation therewith. The housing is preferably composed of steel. The seal ring is preferably composed of bronze, although it could be composed of other materials such as, for example, aluminum (preferably anodized), a plastic (preferably of the Bakelite type) and carbon. The seal between the casing and the seal ring is preferably a rubber O-ring. A wave spring in the casing maintains the O-ring in proper sealed engagement with both the seal ring and the casing. The assembly includes a sleeve adapted to be affixed to a rotating shaft or axle and this sleeve has an outer periphery which is sized relative to the inner wall of the seal ring so as to maintain a constant close running clearance gap which is not varied due to shaft run-outs or the like irregularities because the seal ring floats in its casing.

Although minor modifications might be suggested by those versed in the art, it should be understood that I wish to embody within the scope of the patent granted hereon, all such modifications as reasonably and properly come within the scope of my contribution to the art.

I claim:

1. A railroad journal box seal for mounting in the inboard cover of a railroad journal box in sealing relation with an axle supported by the journal which comprises: a smooth outer diameter surface sleeve press-fit on the axle, casing of U-shaped cross-section opening radially inwardly and press-fit into the journal box cover radially outward from the sleeve having a radially inner diameter spaced from the sleeve, a rigid seal ring in said casing having two radial side faces, a circumferential groove in one of said side faces, an elastomeric O-ring seal in said groove, a wave spring between the other of said side faces and a side of the casing urging the seal ring against the O-ring and the O-ring into sealing engagement with the casing, means in said casing holding said seal ring against rotation, the axially extending wall portion of the casing spaced from the outer diameter of the seal ring allowing free radial shifting of the seal ring under shaft throw-out conditions and the inner diameter of the seal ring being smooth and spaced from the sleeve by a shallow running clearance air gap.

2. The journal box seal of claim 1 wherein the said rigid seal ring is composed of bronze.

3. A railroad journal box seal for mounting in the inboard cover of a railroad journal box in sealing relation with an axle supported by the journal which comprises: a smooth outer diameter surface sleeve press-fit on the axle, a casing of U-shaped cross-section opening radially inwardly and press-fit into the journal box cover radially outward from the sleeve having a radially inner diameter spaced from the sleeve, a rigid seal ring in said casing having two radial side faces, resilient seal means between one of said side faces and the adjacent side of the casing, spring means between the other of said side faces and a side of the casing urging the seal ring against the seal means and the seal means into sealing engagement with the casing, means in said casing holding said seal ring against rotation, the axially extending wall portion of the casing spaced from the outer diameter of the seal ring allowing free radial shifting of the seal ring under shaft throw-out conditions and the inner diameter of the seal ring being smooth and spaced from the sleeve by a shallow running clearance air gap.

4. The seal of claim 3 wherein said adjacent side of the casing is coated with a plastic having a low coefficient of friction to accommodate free radial shifting of the seal ring.

References Cited

UNITED STATES PATENTS

| | | | |
|---|---|---|---|
| 3,138,390 | 6/1964 | Jensen | 277—96 X |
| 3,168,871 | 2/1965 | Sieghartner | 277—65 X |
| 3,207,521 | 9/1965 | Dega | 277—37 |
| 3,214,180 | 10/1965 | Hudson et al. | 277—37 |
| 3,306,620 | 2/1967 | Taschenberg | 277—41 |
| 3,314,680 | 4/1967 | Lagasse et al. | 277—41 |
| 2,583,019 | 1/1952 | Saywell | 277—165 X |

LAVERNE D. GEIGER, *Primary Examiner.*

J. MEDNICK, *Assistant Examiner.*